United States Patent [19]  
Gustavsson et al.

[11] 4,306,890  
[45] Dec. 22, 1981

[54] APPARATUS FOR CLEANING OF FILTER ELEMENTS

[75] Inventors: Karl-Axel G. Gustavsson; Kai A. Valli, both of Enköping, Sweden

[73] Assignee: Bahco Industri AB, Enköping, Sweden

[21] Appl. No.: 195,177

[22] Filed: Oct. 8, 1980

[30] Foreign Application Priority Data

Oct. 17, 1979 [SE] Sweden ............................. 7908622

[51] Int. Cl.$^3$ ............................................. B01D 46/04
[52] U.S. Cl. ........................................ 55/273; 55/283; 55/284; 55/294; 55/302
[58] Field of Search ................. 55/283, 273, 294, 302, 55/284

[56] References Cited

U.S. PATENT DOCUMENTS

| 2,369,649 | 2/1945 | Abrams | 55/287 |
| 2,391,534 | 12/1945 | Yerrick et al. | 55/287 |
| 2,731,107 | 1/1956 | Hershey | 55/283 |
| 2,850,112 | 9/1958 | Dry | 55/287 |
| 2,980,207 | 4/1961 | Allen | 55/283 |
| 3,325,978 | 6/1967 | Rymer | 55/302 |

FOREIGN PATENT DOCUMENTS 2529044 1/1977 Fed. Rep. of Germany .  
1395983 5/1975 United Kingdom ................. 55/302

Primary Examiner—Bernard Nozick  
Attorney, Agent, or Firm—Oblon, Fisher, Spivak, McClelland & Maier

[57] ABSTRACT

An apparatus is provided for the cleaning by compressed air of a plurality of separate filter elements, e.g. compact filter cells, grouped around a common center, which have their clean gas outlets situated in the bottom of a clean gas chamber common to the filter elements. A duct of gooseneck shape is connected at its inlet end to a compressed air source and is swivelably mounted so that its outlet end opens out over any one of the clean gas outlets of the filter elements at selectable stations. The duct flares out continuously within a considerable portion of its extension in a direction towards the outlet end, partly within a first and a second portion so that it prevents the expanding and expanded compressed air, respectively from not following the inside of the duct, and partly within a third, terminating portion at the outlet end of the duct which is shaped so as to form a belled portion.

6 Claims, 5 Drawing Figures

APPARATUS FOR CLEANING OF FILTER ELEMENTS

BACKGROUND OF THE INVENTION

1. Field of the Invention

The invention relates to an apparatus for the cleaning by compressed air of a plurality of separate filter elements or compact filter cells which are grouped around a common center with their clean gas outlets situated in the bottom of a common clean gas chamber.

2. Description of the Prior Art

Compressed air at an excess pressure of 6 bar, for example, is generally used for blowing filter elements clean, using an impulse of very short duration, which impulse is counter to the flow of the gas which is cleaned when the filter element is in use. The flow of gas which is being cleaned is temporarily interrupted during cleaning of the filter element.

It is known per se to direct an air stream by means of a rotatable distributor to one or another of a plurality of filter elements arranged around a common centre. Such a rotatable distributor for supplying a large air volume to a filter element is illustrated in the Swedish Pat. No. 185,552 (or the U.S. Pat. No. 2,731,107).

A distributor according to such publication is however unusable for transferring a compressed air impulse of short duration to a filter element, since the major portion of the shock-cleaning effect of the pulse would be lost in the distributor.

SUMMARY OF THE INVENTION

The object of the invention is therefore to provide an apparatus which is capable of transferring a compressed air impulse from a central point, with minor loss of shock-cleaning effect, to any one of a plurality of filter elements surrounding the vertical axis of the point.

The desired result is obtained by the apparatus being given the characterizing features disclosed in the present invention.

BRIEF DESCRIPTION OF THE DRAWINGS

Various other objects, feature and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE EMBODIMENT

Figure 1:
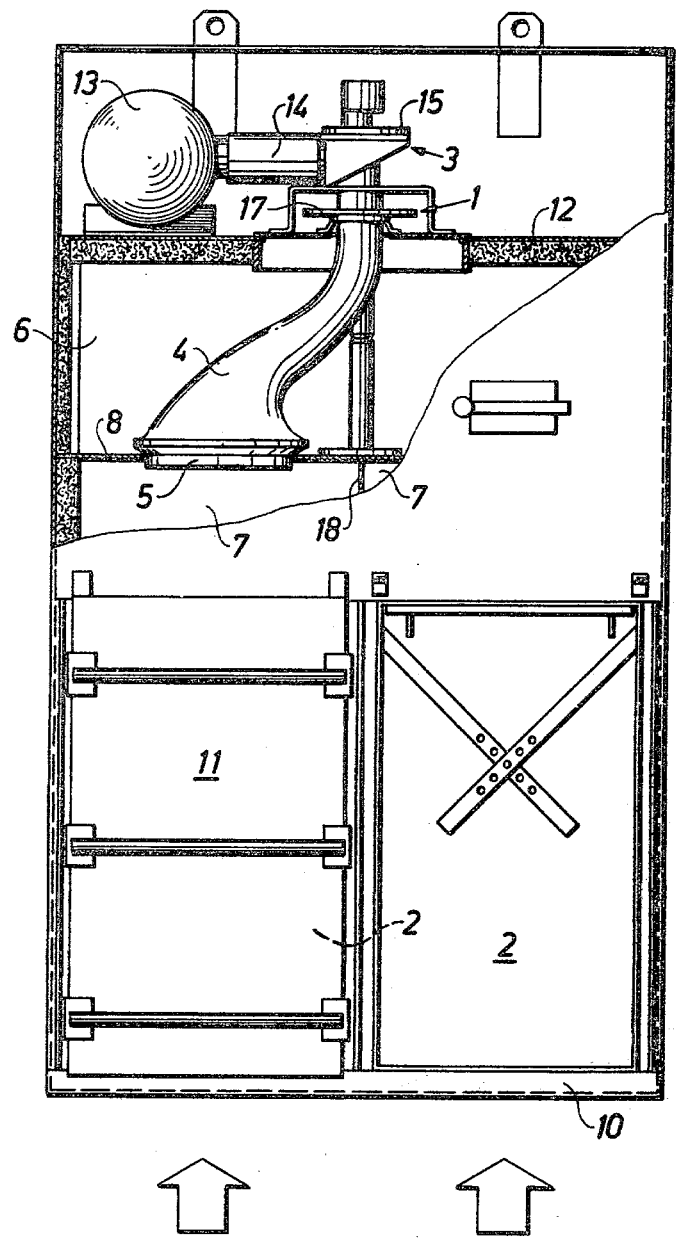
FIG. 1 is a partially sectioned front view of a compact cell filter with four filter elements in the form of exchangeable cells, of which one is visible through a removed service hatch.
Figure 2:
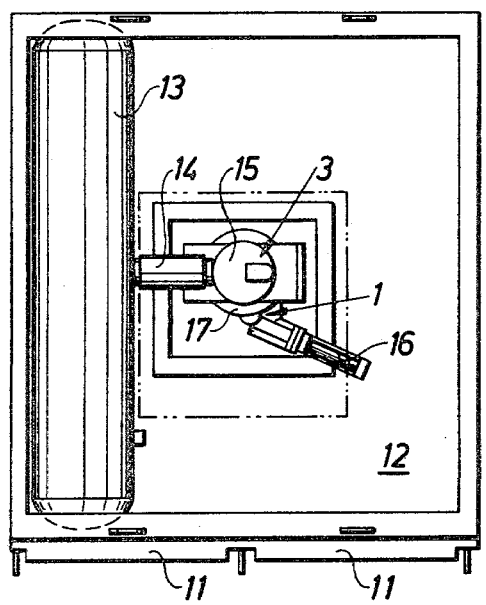
FIG. 2 is a view seen from above of the filter, with an upper hatch taken away, to show the blowing equipment for filter cleaning.

To provide initial familiarity with the drawings, it is mentioned that the compact cell filter has a step feeder 1, partially controlling the cleaning sequence; four filter elements 2, which are in the form of compact cells, and are uniformly disposed in a square configuration about a common centre; a compressed air source 3, with the ability of emitting cleaning shocks in the form a compressed air impulse of very short duration; a duct 4 driven by the step feeder for distributing the cleaning shocks to the respective filter element; clean gas outlets 5 from the filter elements; a clean gas chamber 6, in which the duct 4 is arranged and into which the outlets 5 open; chambers 7 connecting each filter element separately to its clean gas outlet; a bottom 8 in the clean gas chamber, with which the duct 4 coacts, and in which the outlets 5 are situated, bottom 8 having portions apart from the outlets serving as rest positions 9 for the duct 4 during its stepwise movement.

The compact cell filter according to the drawings is conventionally provided with a dust hopper (not shown) below it, via which the raw gas for cleaning is supplied, this gas arriving at the inlet of the filter element, i.e. its bottom surface 10, where the downwardly open raw gas channels of the filter element have their openings, and where the filter fabric folds close the ends of the intermediate clean gas channels.

Figure 3:
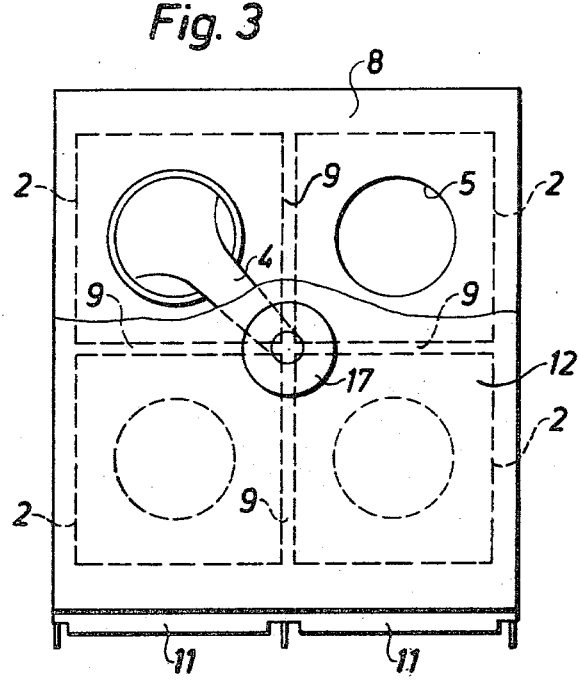
FIG. 3 is a view corresponding to that in FIG. 2, with the blowing equipment in the upper part of the filter removed, and the bottom in this upper portion partially broken off to show the clean gas chamber below.

It will be seen from FIG. 3 that the filter has four filter elements 2, each of which has a substantially quadratic cross section, the elements being grouped substantially side by side in a configuration which similarly has a quadratic cross section. The four filter elements are placed in a common chamber, downwardly open towards the dust hopper, the chamber upwardly merging into the separate chambers 7, one for each of the filter elements. The filter elements are accessible for exchange after removing service hatches 11.

The clean gas channels open out in the upper ends of the filter elements, where the filter fabric folds close the ends of the raw gas channels. Cleaned gas thus comes to the chambers 7. The streams of clean gas then come into the common clean gas chamber 6 via openings 5 in the bottom 8 thereof, and depart collectively via an outlet (not shown).

For compressed air cleaning of the filter elements the filter is provided, on the roof 12 of the clean gas chamber 6, with the compressed air supply 3, including a pressurized tank 13 connected to a compressed air network (not shown) and a valve 15 connected to the tank by a short trunk 14, valve 15 being of the conventional quick-opening type for generating very heavy shocks of short duration. This normally electromagnetically-pneumatically actuated valve is controlled, together with the step feeder 1, by a program unit (not shown), which thereby provides individual clean-blowing of the filter elements 2 at uniform intervals in order, and one at a time.

A piston-cylinder apparatus or other linear motor 16 and a toothed wheel 17 are the main components of the step-feeder 1. The toothed wheel 17 is nonrotatably connected to the duct 4, which is rotatably mounted in bearings of the roof 12. The duct is of a generally goose-necked shape, and at its upper end is connected to the outlet of the valve 15 for the compressed air impulse. The bottom end of the duct is situated at a radial distance from the rotational axis of the tube and is dimensioned such that in selected turning positions, and under the control of the step feeder 1 it can connect the duct to any one of the four equally large clean gas outlets 5 in the bottom 8. The outlets 5 are arranged at the same distance from the center of rotation and with uniform spacing.

Figure 4:
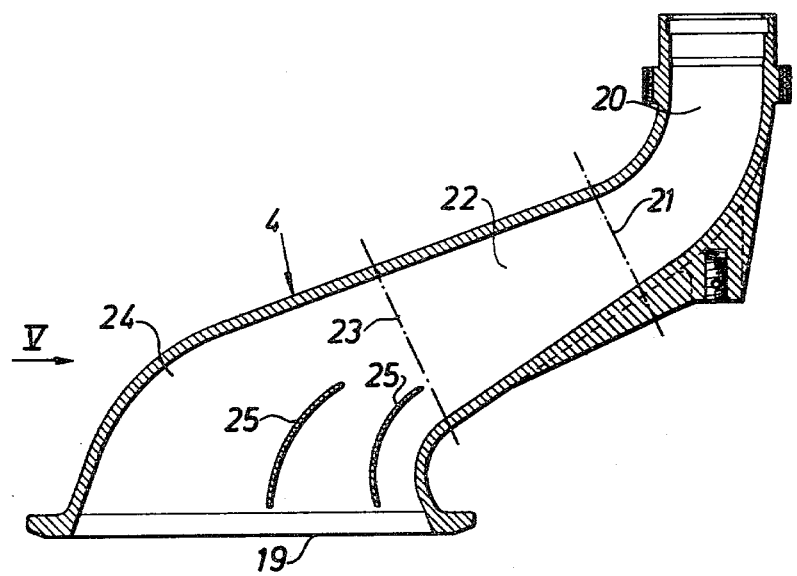
FIG. 4 is a longitudinal sectional view along the line IV—IV in FIG. 5 through a distribution duct for the compressed air impulse, the duct being of an S-shape and incorporated in the blowing equipment for filted cleaning.
Figure 5:
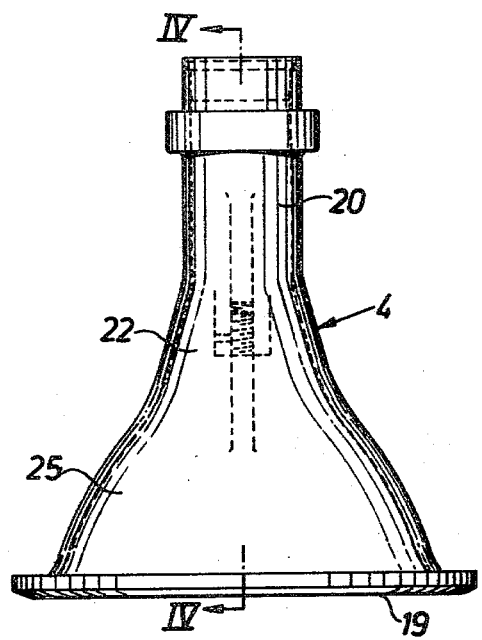
FIG. 5 is a view of the duct in FIG. 4, as seen in the direction of the arrow V.

As may sheet be seen in FIG. 4, the duct 4 flares out continuously, substantially along the whole of its length, towards its outlet end 19. The duct suitably has a substantially circular cross section. More specifically, the duct flares to a minor extent within a first portion 20, and to a somewhat greater degree within a second portion 22. The first portion extends substantially from the duct inlet end to a place denoted by a chain-dotted line 21, and constitutes an expansion zone for the compressed air. The second position 22 extends between the places denoted by chain-dotted lines 21 and 23, and with its diffusor-like form it serves to regain pressure from the generally expanding compressed air. From the chain-dotted line 23 to the outlet end 19 the duct 4 further flares, and here in its terminating third portion 24 it has been given a form similar to the flare at the end of a wind instrument or a megaphone.

To achieve uniform distribution of the compressed air pulse in the filter cell, guide fins 25 are disposed at the severely curved inner bend of this sharply flared third portion 24. Within its first portion 20, the duct 4 has a flare angle selected such that the cross-sectional area of the duct increases generally in proportion to the expansion of the compressed air flowing through. Measured between opposing side portions of the duct, this flare angle suitably lies within the range of 5°-20°, preferably 6°-15°. The angle can be constant or vary along the longitudinal extension of the portion 20. Within its second portion 22, the duct 4 has a flare angle selected so as to serve the purpose of pressure recovery. The angle is suitably within the range of 5°-45°, preferably 6°-20°, and can be constant or can vary along the longitudinal extension of the portion.

The step feeder 1 drives the duct 4 in eight steps of 45° per revolution, and thus rest positions 9, which are separate from the clean gas outlets 5, are obtained between the outlets by suitably dimensioning of the latter and the lower end of the duct 4, in relation to the available circumference for rotational movement of this duct end. The step feeder thus operates with double as many steps per revolution, selected angularly symmetrical as the number of filter elements.

For most of the time the program unit keeps duct 4 in one of the rest positions 9, all filter elements 2 then being utilized for cleaning the raw gas. At uniform intervals the program unit moves the duct 4 to the nearest clean gas outlet in the rotational direction and momentarily opens valve 5 which, while utilizing the stored air of the pressure tank, provides a sudden and heavy compressed air shock through duct 4 to the filter element 2 connected thereto at that instant, element 2 being separated from the three other filter elements via intermediate walls 18 against adjacent chambers 7 and the seal of duct 4 against the edges of the clean gas outlet 5. With the aid of the duct 4, and particularly its configuration, the compressed air shock is effectively utilized for cleaning the connected filter element, from the raw gas side of which liberated dust falls down into the duct hopper (not shown) under the filter elements.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for the cleaning by compressed air of a plurality of separate filter elements which are grouped about a common center defining an axis comprising:
    a clean gas chamber common to all the filter elements and having clean gas outlets respectively situated at a bottom of said clean gas chamber;
    a single compressed air source including means for generating a cleaning pulse of compressed air;
    a duct of gooseneck configuration, having an inlet portion thereof connected to and rotatable about said axis, said duct including an air outlet end portion thereof for opening out centrally over at least one of said clean gas outlets of the filter elements at predetermined stations, for leading said cleaning pulse of compressed air from said single compressed air source to one of said plurality of filter elements;
    said duct comprising a first initial portion, a second middle portion and a third connecting portion, at least said second and third portion being flared for guiding expanding pulsed compressed air along said first and second portion so as to follow the inside of the duct, wherein said third terminating portion is located at the outlet end of the duct and comprises a belled portion;
    step feeder means for positioning said duct in a number of angularly symmetrically predetermined positions equal to twice the number of said plurality of filter elements so as to allow for positioning of said duct at rest positions located intermediate the clean gas outlets of said plurality of filter elements, whereby filtration may occur with unobstructed clean gas outlets; and
    a plurality of intermediate wall members forming at least one chamber between each of said filter elements and the respective clean gas outlets such that said chambers are tightly separated from each other and wherein the duct in a connected position over the clean gas outlet comprises a tightly sealed outlet to close off normal gas flow through at least one of the filter elements while said at least one filter element is being cleaned.

2. An apparatus as claimed in claim 1, further comprising guide fins mounted inside the duct.

3. An apparatus as claimed in claims 1 or 2 wherein the duct has within the first portion an angle of flare such that the cross-sectional area of the duct increases gradually in proportion to the expansion of the compressed air flowing through the flare angle and said flare angle is within the range of 5°-20°.

4. An apparatus as claimed in claim 3 wherein the flare angle is within the range of 6°-15°.

5. An apparatus as claimed in claim 3 wherein the duct has within the second portion a second flare angle such that the second portion serves to regain pressure and wherein said second flare angle is within the range of 5°-45°.

6. An apparatus as claimed in claim 5, wherein the second flare angle is within the range of 6°-20°.

* * * * *